United States Patent
Connelly et al.

(10) Patent No.: US 6,575,640 B2
(45) Date of Patent: Jun. 10, 2003

(54) FIBER OPTIC CONNECTION SYSTEM

(75) Inventors: John M. Connelly, Tinley Park, IL (US); Samuel M. Marrs, Bradley, IL (US); Jeffrey J. Radek, Schaumburg, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 10/288,163

(22) Filed: Nov. 5, 2002

(65) Prior Publication Data

US 2003/0059168 A1 Mar. 27, 2003

Related U.S. Application Data

(63) Continuation of application No. 09/499,170, filed on Feb. 4, 2000, now Pat. No. 6,511,230.

(51) Int. Cl.[7] .................................................. G02B 6/38
(52) U.S. Cl. ............................... 385/69; 385/62; 385/87
(58) Field of Search ............................. 385/56, 58, 60, 385/62, 66, 69, 71, 72, 87

(56) References Cited

U.S. PATENT DOCUMENTS 5,971,625 A * 10/1999 Lu ............................... 385/60

* cited by examiner

Primary Examiner—Mark A. Robinson
Assistant Examiner—Alessandro V. Amari
(74) Attorney, Agent, or Firm—Robert A. McCann; Jay A. Saltzman; Christopher S. Clancy

(57) ABSTRACT

The present invention is a fiber optic connection system including a fiber optic plug adapted to mate and lock with a fiber optic connector. The plug includes a housing and mated insert that cooperate to position and secure the plug pre-assemblies with respect to the plug and to structurally affix the cable strengthener to the plug.

9 Claims, 4 Drawing Sheets

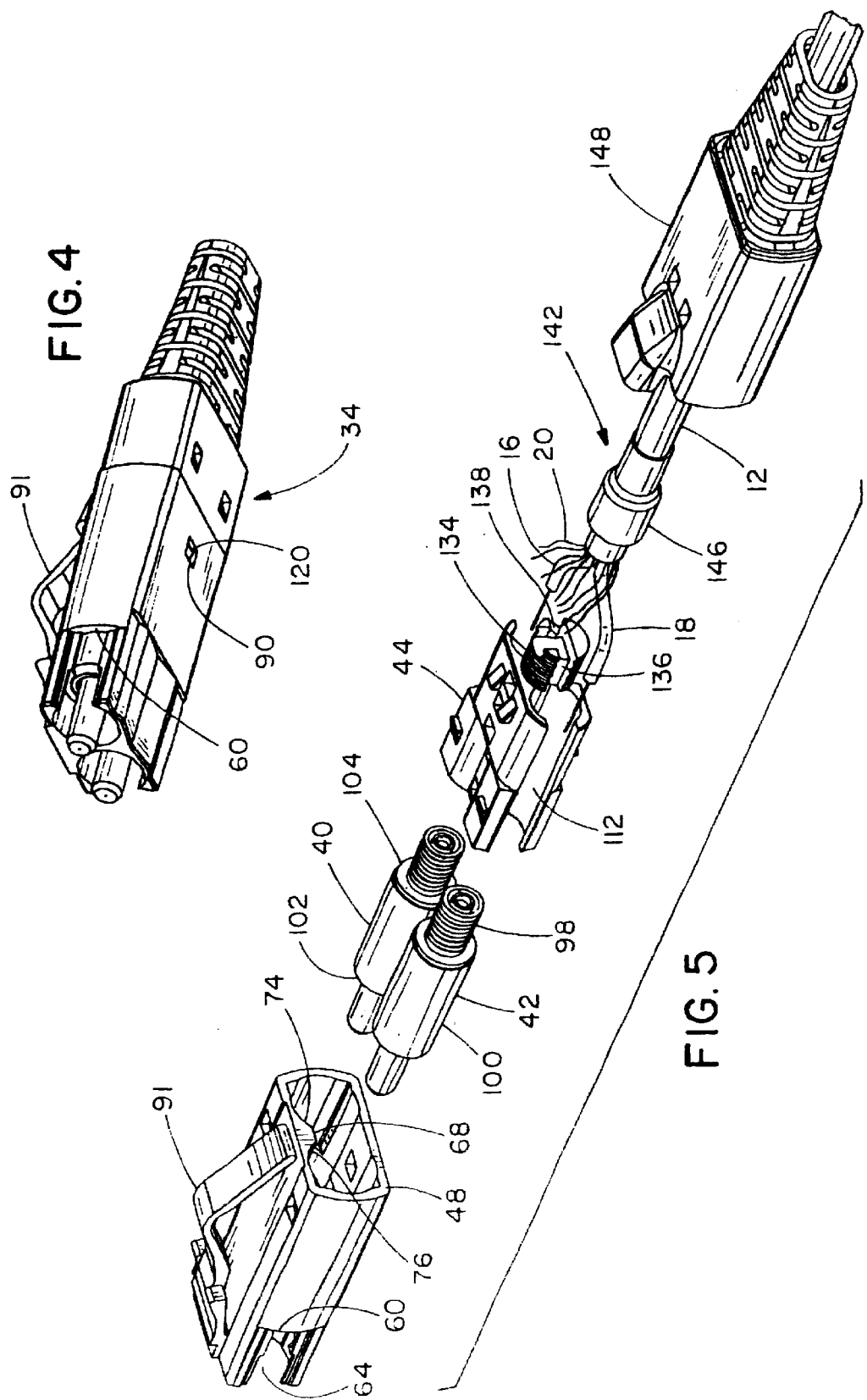

FIBER OPTIC CONNECTION SYSTEM

This application is a continuation of application Ser. No. 09/499,170 field Feb. 4, 2000, now U.S. Pat. No. 6,511,230.

BACKGROUND OF THE INVENTION

The present invention relates generally to a fiber optic connection system and, more particularly, to a fiber optic plug wherein a housing and mating insert cooperate to secure the fiber optic cable and plug pre-assemblies with respect to the plug.

Fiber optic transmission of information is now virtually commonplace. Its continued growth demands the development of inexpensive, readily manufactured and quickly replacable connection systems. One such connection system is shown in U.S. Pat. No. 5,828,804, and the teachings thereof are fully incorporated herein by reference.

SUMMARY OF THE INVENTION

In a principal aspect, the present invention is a fiber optic connection system including a fiber optic plug adapted to mate and lock with a fiber optic connector. As used herein, the term "connector" means (i) a jack whereby two fiber optic cables are coupled together and (ii) an interface housing, such as a transceiver, whereby a fiber optic cable is coupled to a piece of hardware.

The plug includes a housing, a pair of plug pre-assemblies and an insert. The housing has curved or arcuate side walls that partially define two passageways. The plug pre-assemblies reside within the passageways.

The housing and insert snap-lock together and cooperatively define a mechanism to position and maintain the plug pre-assemblies. That is, the housing and insert cooperatively secure the assemblies with respect to the plug. The housing and insert further cooperate to secure the fiber optic cable with respect to the plug for proper loading, i.e., the strengthener of the cable (such as aramid yarn) is secured to the plug.

It is thus an object of the present invention to provide a new and improved fiber optic connection system. Another object is an inexpensive, readily produced connection system for fiber optic cable. Still another object is a fiber optic connection wherein the plug and connector are interlocked to provide connection stability and to substantially avoid connection "play."

Yet another object of the present invention is fiber optic plug including a housing and insert snap-locked thereto to substantially facilitate assembly and repair. It is also an object to provide a plug for fiber cable connection system, wherein a housing and mated insert cooperatively secure the plug pre-assemblies and strengthener of the cable to the plug.

These and other features, objects and advantages of the present invention are set forth or apparent in the following detailed description.

BRIEF DESCRIPTION OF THE DRAWING

Various preferred embodiments of the present invention are described herein with reference to the drawing herein:

FIG. 4 is a bottom perspective view of the fiber optic plug shown in FIG. 2; and FIG. 5 is an exploded perspective view of a second preferred embodiment of the fiber optic plug.

DETAILED DESCRIPTION OF VARIOUS PREFERRED EMBODIMENTS

Figure 1:
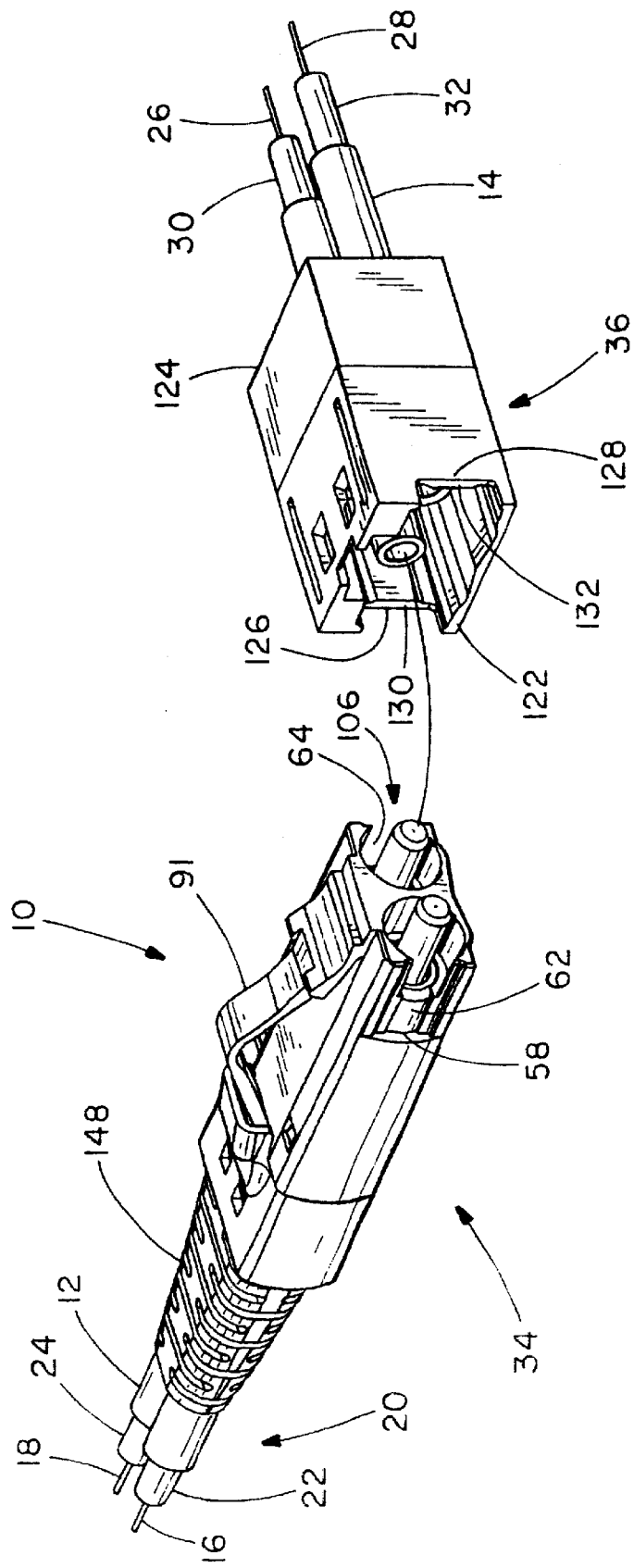
FIG. 1 is a top perspective, partial cut-away view of a first preferred embodiment of the present invention.

A first preferred embodiment of the present invention is shown in FIGS. 1–4 as a fiber optic connection system, generally designated 10. The system 10 operatively couples first and second fiber optic cables 12, 14 in an interlocked state. The cable 12 includes side-by-side optical fibers 16, 18, and a cable strengthener, generally designated 20 and typically an aramid yarn. In this preferred embodiment, the optical fibers 16, 18 are individually wrapped with strengthening elements 22, 24, respectively, shown in FIG. 1 as a solid strand jacket and in FIGS. 3 and 5 as separated loose strands. The second cable 14 similarly includes fiber elements 26, 28 and strengthening elements 30, 32.

The system 10 includes a fiber optic plug 34, structurally affixed or secured to the cable strengthener 20 and, more particularly, the strengthening elements 22, 24, and a fiber optic jack 36 structurally affixed to the strengthening elements 30, 32. The jack 36 receives the plug 34 in the interlocked state to selectively couple the bare glass fibers of the optical fibers 16, 18 to the bare glass fibers of the fiber elements 26, 28, respectively, as is well known in the art.

Figure 2:
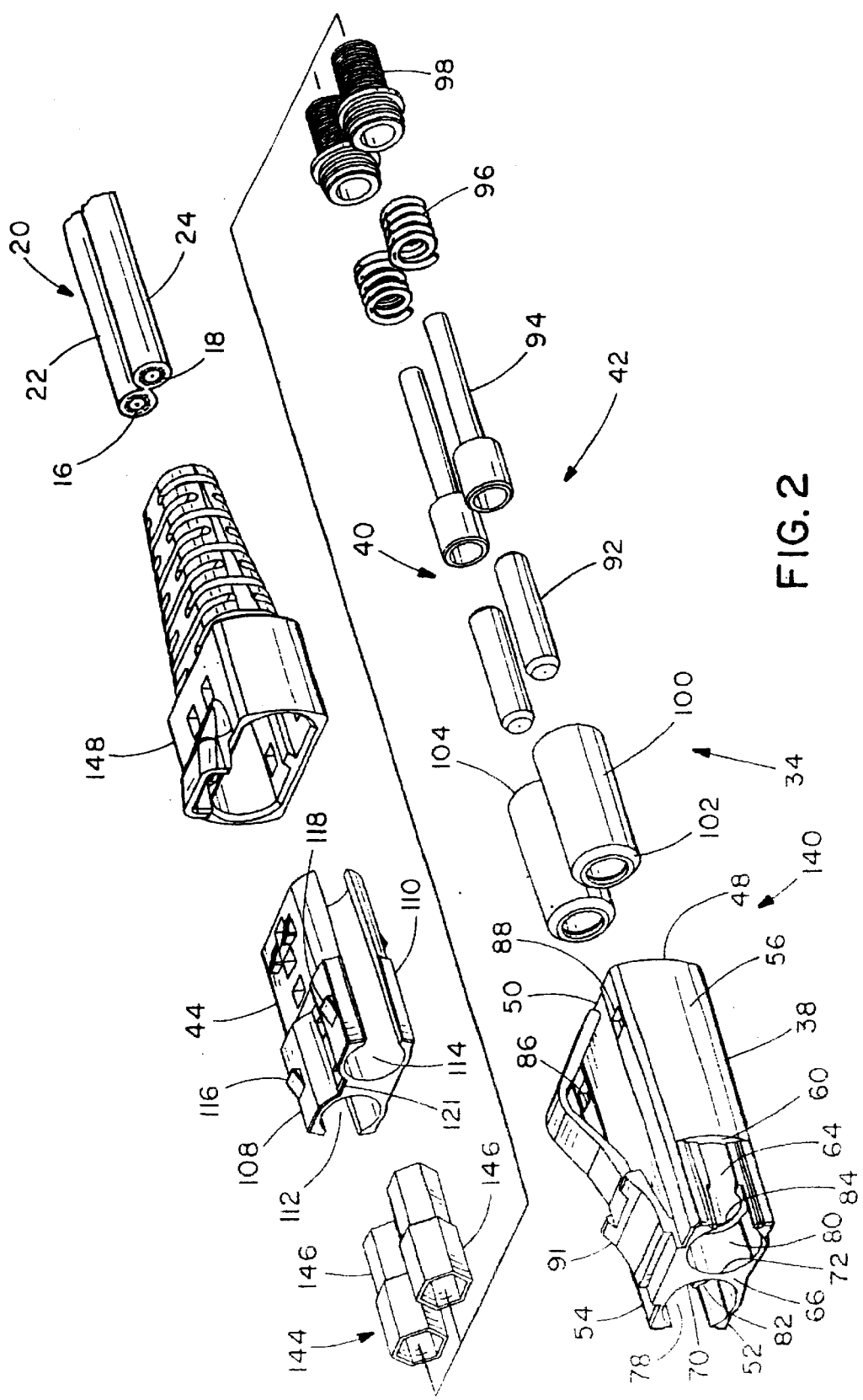
FIG. 2 is an exploded perspective view of the fiber optic plug shown in FIG. 1.

The plug 34 includes a housing 38, first and second plug pre-assemblies, generally designated 40, 42 in FIG. 2, and an insert 44, assembled as shown. The housing 38 is generally rectangular and has a front housing end 46 and a rear housing end 48. The jack 36 receives at the front housing end 46; the insert 44 is received at the rear housing end 48.

Figure 3:
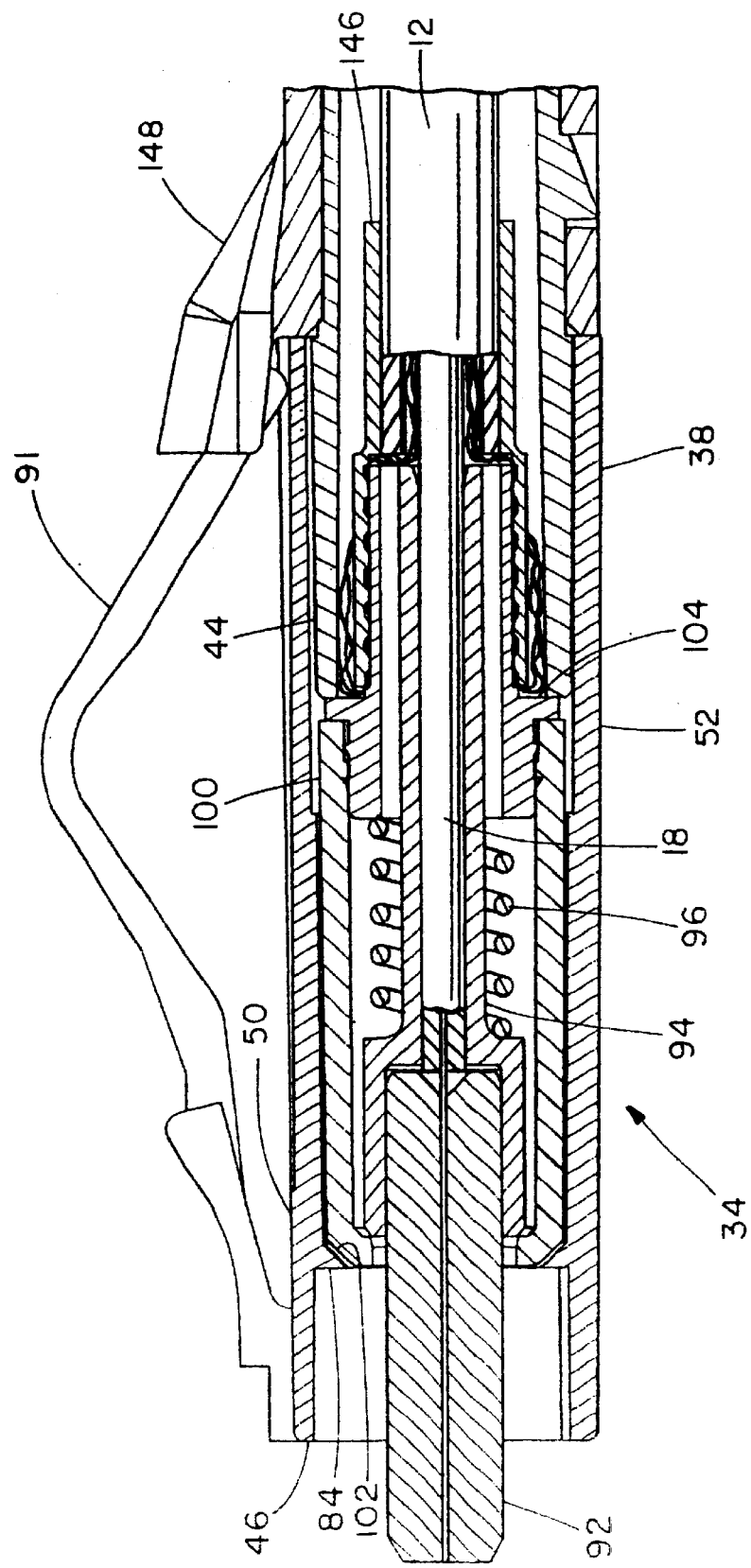
FIG. 3 is an enlarged, partial cross-sectional view of the fiber optic plug shown in FIG. 2.

The housing 38 includes a substantially planar top wall 50, a substantially planar bottom wall 52, and substantially arcuate side walls 54, 56. As best shown in FIGS. 2 and 3, the side walls 54, 56 terminate a predetermined distance from the front housing end 46. As such, the housing 38 provides first and second plug stabilizing surfaces 58, 60, defined by the terminating edges of the side walls 54, 56, respectively, and first and second side windows 62, 64.

The housing 38 also includes an interior, central dividing wall 66, extending vertically from the top wall 50 to the bottom wall 52. The dividing wall 66 extends longitudinally from the front housing end 46 to a point between the rear housing end 48 and the plug stabilizing surfaces 58, 60. An upper portion 68 of the dividing wall 66, adjacent the top wall 50, extends to the rear housing end 48. The dividing wall 66 and the upper portion thereof 68 have arcuate side surfaces 70, 72, and 74, 76, respectively, substantially matching the curvature of the side walls 54, 56. Portions of the top and bottom walls 50, 52 form similar interior curves, such that the housing 38 defines side-by-side cylindrical housing passageways 78, 80. The housing 38 further includes thin, substantially annular flanges 82, 84, extending circumferentially within the cylindrical passageways 78, 80, in the region between the housing front end 46 and the plug stabilizing surfaces 58, 60.

The top wall 50 defines a pair of opposed snap openings 86, 88 near the rear end 48 of the housing 38. The bottom wall 52 defines a third central snap opening 90. In this preferred embodiment, the housing 38 includes a conventional latch 91, extending from the front housing end 46 along the top wall 50.

Each of the plug pre-assemblies 40, 42 is a conventional spring-biased assembly. Each assembly 32, 34 includes ceramic ferrule 92, ferrule holder 94, spring 96, backbone 98 and plastic outerbody 100. The outerbody 100 receives and is ultrasonically welded to the backbone 98. The outerbody 100 is centrally located and defines a radially extending front face 102 of the plug pre-assembly 40, 42; the backbone 98 defines a radially extending rear face 104 of the plug pre-assembly 40, 42. The bare glass fibers are secured, in a conventional fashion, to the forwardly extending ceramic ferrules 92. The plug pre-assembles 40, 42 reside within and pass through the passageways 78, 80, respectively. The front face 102 engages and stops against one of the annular flanges 82, 84 therein, with the ceramic ferrule 92 extending beyond the front housing end 46, in a conventional manner.

The side windows 62, 64 provide visual access into the housing passageways 78, 80, respectively, and expose the outerbody 100 of each plug pre-assembly 40, 42. The outerbody 100 is conventionally color-coded, with beige representing multi-mode and blue representing single-mode. The color thereof can be readily seen through the side windows 62, 64, thereby facilitating identification and replacement.

The front housing end 46 defines a predetermined corner pattern, generally designated 106. This corner pattern 106 matches the corner pattern of prior connectors distributed by the assignee, whereby the plug 34 is compatible therewith.

The insert 44 snap-locks into the housing 38, driving the plug pre-assemblies 40, 42 into abutment with the annular flanges 82, 84 and securing the strengthening elements 22, 24 to the plug 34. More particularly, the insert 44 includes first and second outwardly opening, substantially C-shaped sections 108, 110, which define first and second insert passageways 112, 114, respectively. In an assembled plug state, the housing passageways 78, 80 and the insert passageways 112, 114 substantially axially align. The diameter of the insert passageways 112, 114 is less than the diameter of the housing passageways 78, 80, and the insert 44 engages the dividing wall 66 and the two rear faces 104 in the assembled plug state. As such, the plug pre-assemblies 40, 42 are locked with respect to the housing 38.

The insert 44 includes first and second, opposed upper snap projections 116, 118, and a central lower snap projection 120. In the assembled plug state, the projections 116, 118, 120 engage and lock into the snap openings 86, 88, 90 of the housing 38. The insert 44 further include a central, upwardly open channel 121 to receive the upper extension 68 of the dividing wall 66. This overall configuration facilitates assembly of the connection system 10, allowing the insert 44 to be quickly oriented with respect to the housing 38.

The fibers 16, 18 and strengthening elements 22, 24 reside within the insert passageways 112, 114 in the assembled plug state. The open outer sides of the passageways 112, 114 facilitate assembly and replacement.

The fiber optic jack 36 has front and rear jack ends 122, 124. The jack 36 receives the plug 34 through front jack end 122 and the cable 14 through the jack rear end 124. The front end 122 thereof has an inner configuration substantially corresponding to the housing end 46. In a conventional fashion, the latch 91 snap-locks to the jack 36 in the state.

The jack 36 includes first and second side offsets 126, 128 extending rearwardly from the front jack end 122 to provide first and second jack stabilizing surfaces 130, 132, respectively. In the interlocked state of the connection system 10, the plug stabilizing surfaces 58, 60 engage and abut the jack stabilizing surfaces 130, 132, respectively. This solid contact between four surfaces 58, 60, 130, 132 substantially enhances and stabilizes the interconnection between the fiber optic plug 34 and jack 36.

Another preferred embodiment of the present invention is shown in FIG. 5. This embodiment is used with fiber optic cable wherein the optical fibers 16, 18 are wrapped with a single strengthening element 20. To maintain proper loading, the strengthening element 20 is affixed to the insert 44, as opposed to the plug pre-assemblies 40, 42.

In this preferred embodiment, the insert 44 includes a rearwardly extending, substantially cylindrical boss 134. The boss 134 is centrally located, substantially interposed the first and second insert passageways 112, 114, and defines two, substantially opposed fiber slots 136, 138, extending therethrough. The fibers 16, 18 extend through the first and second insert passageways 112, 114 and the fiber slots 136, 138, terminated at the ferrules 92 in a conventional fashion.

In each of the preferred embodiments, the fiber optic cable 12 is affixed to the plug 34 for proper loading, i.e., substantially avoiding strain on the optical fibers 16, 18. The housing 38 and the insert 44 cooperate to define interconnection means, generally designated 140, for (i) positioning and securing the plug pre-assemblies 40, 42 with respect to the plug 34, and (ii) structurally affixing or securing the strengthener 20 to the plug 34.

In the preferred embodiment described immediately above, the interconnection means 140 includes first crimp means, generally designated 142, for securing the single strengthening element 20 to the insert 44 or, more particularly, the boss 134 thereof. In the first preferred embodiment, the interconnection means 140 includes second crimp means, generally designated 144, for securing the strengthening elements 22, 24 to the plug pre-assemblies 40, 42 or, more particularly, the backbones 98 thereof. The first and second crimp means 142, 144 include conventional fiber optic crimping elements 146.

To further reduce strain upon the cable 12, the connection system 10 includes a conventional strain relief boot 148. The boot 148 is snap-locked to the insert 44, as best shown in FIGS. 2 and 5.

Various preferred embodiments of the present invention have been described herein. It is to be understood that modifications and changes can be made without departing from the true scope and spirit of the present invention, as defined by the following claims which are to be interpreted in view of the foregoing.

We claim:

1. A fiber optic connection system comprising, in combination:

a first fiber optic cable having a first pair of optical fibers and at least a first cable strengthener;

a fiber optic plug, receiving and secured to said first fiber optic cable, including a housing, first and second plug pre-assemblies and an insert, said first and second plug pre-assemblies having front and rear assembly surfaces;

said housing having front and rear housing ends, top and bottom walls and side walls, said top, bottom and side walls defining first and second passageways extending from said front housing end in a substantially side-by-side relationship;

said first and second plug pre-assemblies sliding in said first and second passageways, respectively, and extending beyond said front housing end in an assembled plug state;

said insert at least partially encompassing said optical fibers and being snap-locked to said housing through said rear housing end; and a fiber optic connector to receive said fiber optic plug in an interlocked state, said fiber optic plug snap-locking to said fiber optic connector;

said housing and said insert cooperatively defining interconnection means for positioning and securing said first and second plug pre-assemblies with respect to said fiber optic plug and for structurally affixing said first cable strengthener to said fiber optic plug, said interconnection means includes first and second flanges within said first and second passageways to engage said front assembly surface of said first and second plug pre-assemblies in said assembled plug state, respectively, said insert engaging said rear assembly surface of said first and second plug pre-assemblies in said assembled plug state, thereby securing said first and second plug pre-assemblies with respect to said fiber optic plug.

2. A fiber optic connection system comprising, in combination:

a first fiber optic cable having a first pair of optical fibers and at least a first cable strengthener;

a fiber optic plug, receiving and secured to said first fiber optic cable, including a housing, first and second plug pre-assemblies and an insert, said first and second plug pre-assemblies having front and rear assembly surfaces;

said housing having front and rear housing ends, top and bottom walls and substantially arcuate side walls, said top, bottom and arcuate side walls defining first and second substantially C-shaped passageways extending from said front housing end in a substantially side-by-side relationship;

said first and second plug pre-assemblies sliding in said first and second passageways, respectively, and extending beyond said front housing end in an assembled plug state;

said insert at least partially encompassing said optical fibers and being snap-locked to said housing through said rear housing end; and a fiber optic connector to receive said fiber optic plug in an interlocked state, said fiber optic plug snap-locking to said fiber optic connector;

said housing and said insert cooperatively defining interconnection means for positioning and securing said first and second plug pre-assemblies with respect to said fiber optic plug and for structurally affixing said first cable strengthener to said fiber optic plug.

3. A fiber optic connection system comprising, in combination:

a first fiber optic cable having a first pair of optical fibers and at least a first cable strengthener;

a fiber optic plug, receiving and secured to said first fiber optic cable, including a housing, first and second plug pre-assemblies and an insert, said first and second plug pre-assemblies having front and rear assembly surfaces;

said housing having front and rear housing ends, top and bottom walls and side walls, said top, bottom and side walls defining first and second passageways extending from said front housing end in a substantially side-by-side relationship, said housing having a dividing wall extending vertically from said top wall to said bottom wall;

said first and second plug pre-assemblies sliding in said first and second passageways, respectively, and extending beyond said front housing end in an assembled plug state;

said insert at least partially encompassing said optical fibers and being snap-locked to said housing through said rear housing end; and a fiber optic connector to receive said fiber optic plug in an interlocked state, said fiber optic plug snap-locking to said fiber optic connector;

said housing and said insert cooperatively defining interconnection means for positioning and securing said first and second plug pre-assemblies with respect to said fiber optic plug and for structurally affixing said first cable strengthener to said fiber optic plug.

4. The fiber optic connection system of claim 3 wherein the dividing wall includes an upper portion adjacent said top wall, said upper portion extends from said front housing end to said rear housing end.

5. The fiber optic connection system of claim 4 wherein said insert includes an open channel to receive said upper portion of said dividing wall.

6. A fiber optic connection system comprising, in combination:

a first fiber optic cable having a first pair of optical fibers and at least a first cable strengthener;

a fiber optic plug, receiving and secured to said first fiber optic cable, including a housing, first and second plug pre-assemblies and an insert, said first and second plug pre-assemblies having front and rear assembly surfaces;

said housing having front and rear housing ends, top and bottom walls and side walls, said top, bottom and side walls defining first and second passageways extending from said front housing end in a substantially side-by-side relationship, said top wall defining a pair of opposed snap openings near said rear housing end, and said bottom wall defining a central snap opening;

said first and second plug pre-assemblies sliding in said first and second passageways, respectively, and extending beyond said front housing end in an assembled plug state;

said insert at least partially encompassing said optical fibers and being snap-locked to said housing through said rear housing end; and a fiber optic connector to receive said fiber optic plug in an interlocked state, said fiber optic plug snap-locking to said fiber optic connector;

said housing and said insert cooperatively defining interconnection means for positioning and securing said first and second plug pre-assemblies with respect to said fiber optic plug and for structurally affixing said first cable strengthener to said fiber optic plug.

7. The fiber optic connection system of claim 6 wherein said insert includes first and second, opposed upper snap projections and a lower snap projection, said upper snap projections and said lower snap projection engage and lock into the pair of opposed snap openings and the central snap opening, respectively.

8. A fiber optic connection system comprising, in combination:

a first fiber optic cable having a first pair of optical fibers and at least a first cable strengthener;

a fiber optic plug, receiving and secured to said first fiber optic cable, including a housing, first and second plug pre-assemblies and an insert, said first and second plug pre-assemblies having front and rear assembly surfaces;

said housing having front and rear housing ends, top and bottom walls and side walls, said top, bottom and side walls defining first and second passageways extending from said front housing end in a substantially side-by-side relationship;

said first and second plug pre-assemblies sliding in said first and second passageways, respectively, and extending beyond said front housing end in an assembled plug state;

said insert at least partially encompassing said optical fibers and being snap-locked to said housing through said rear housing end, said insert having a rearwardly extending, substantially cylindrical boss substantially interposed first and second insert passageways to define two, substantially opposed fiber slots extending therethrough; and a fiber optic connector to receive said fiber optic plug in an interlocked state, said fiber optic plug snap-locking to said fiber optic connector;

said housing and said insert cooperatively defining interconnection means for positioning and securing said first and second plug pre-assemblies with respect to said fiber optic plug and for structurally affixing said first cable strengthener to said fiber optic plug.

9. A fiber optic connection system comprising, in combination:

a first fiber optic cable having a first pair of optical fibers and at least a first cable strengthener;

a fiber optic plug, receiving and secured to said first fiber optic cable, including a housing, first and second plug pre-assemblies and an insert, said first and second plug pre-assemblies having front and rear assembly surfaces;

said housing having front and rear housing ends, top and bottom walls and side walls, said top, bottom and side walls defining first and second passageways extending from said front housing end in a substantially side-by-side relationship;

said first and second plug pre-assemblies sliding in said first and second passageways, respectively, and extending beyond said front housing end in an assembled plug state;

said insert at least partially encompassing said optical fibers and being snap-locked to said housing through said rear housing end; and a fiber optic connector to receive said fiber optic plug in an interlocked state, said fiber optic plug snap-locking to said fiber optic connector, said fiber optic connector having first and second side offsets extending rearwardly from a front connector end to provide first and second connector stabilizing surfaces, respectively;

said housing and said insert cooperatively defining interconnection means for positioning and securing said first and second plug pre-assemblies with respect to said fiber optic plug and for structurally affixing said first cable strengthener to said fiber optic plug.

* * * * *

UNITED STATES PATENT AND TRADEMARK OFFICE
CERTIFICATE OF CORRECTION

PATENT NO.   : 6,575,640 B2  Page 1 of 1
DATED        : June 10, 2003
INVENTOR(S)  : Connelly et al.

It is certified that error appears in the above-identified patent and that said Letters Patent is hereby corrected as shown below:

Column 1,
Line 47, after "is" insert -- a --.
Line 50, after "fiber" insert -- optic --.

Column 3,
Line 45, "include" should read -- includes --.
Line 59, after "the" insert -- front --.
Line 60, after the third occurrence of "the" insert -- interlocked --.

Signed and Sealed this

Second Day of March, 2004

JON W. DUDAS
*Acting Director of the United States Patent and Trademark Office*